Nov. 2, 1954     J. E. DRISCOLL     2,693,025
METHOD OF MAKING COMMUTATORS
Filed March 17, 1950
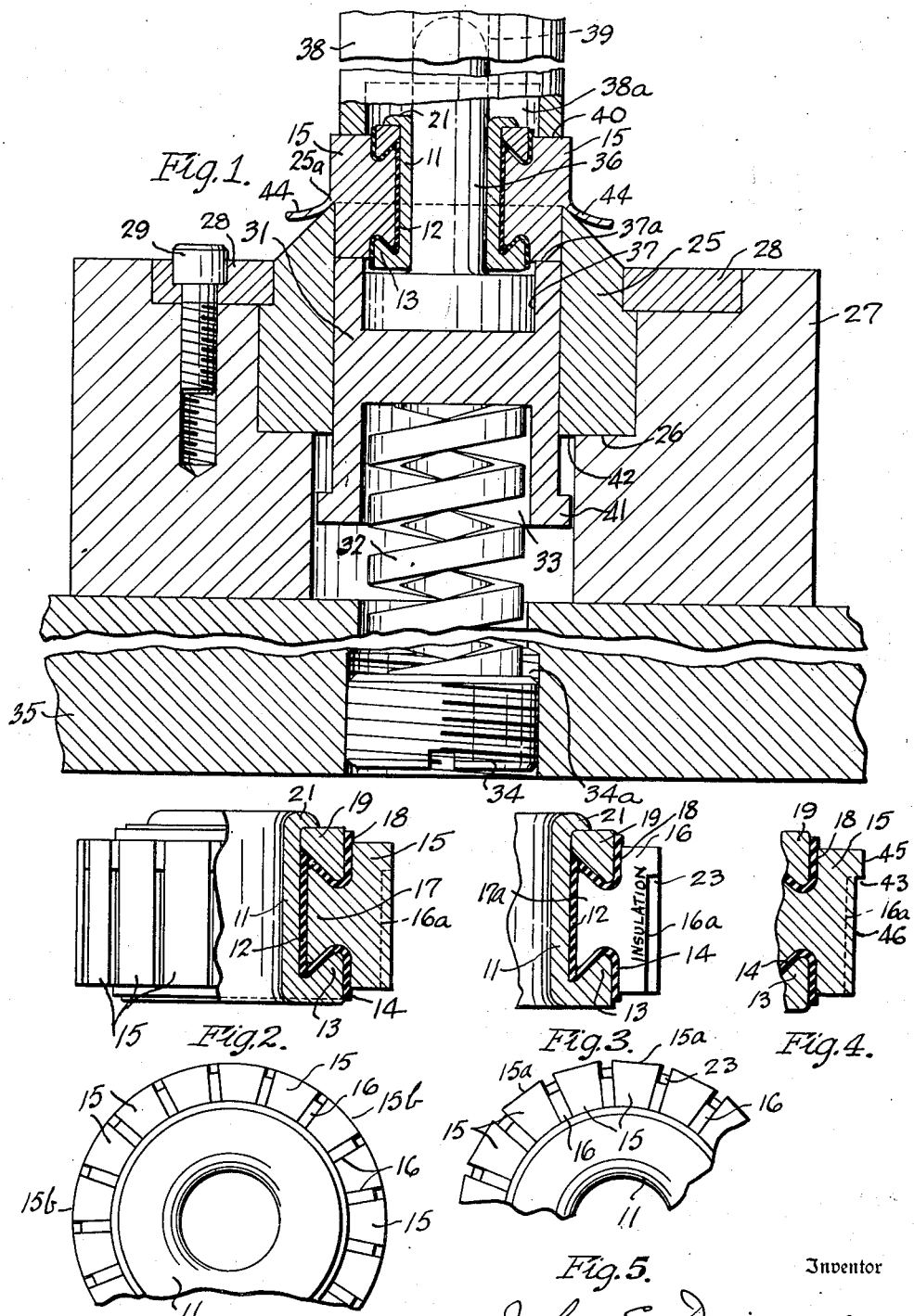
Inventor
By John E. Driscoll
Wooster & Davis Attorneys United States Patent Office 2,693,025
Patented Nov. 2, 1954

2,693,025

METHOD OF MAKING COMMUTATORS

John E. Driscoll, Woodbridge, Conn., assignor to Frederick J. Durrschmidt, Shelton, Conn.

Application March 17, 1950, Serial No. 150,252

4 Claims. (Cl. 29—155.54)

This invention relates to a method of making commutators for electric motors, generators and the like.

Such commutators comprise spaced bars or segments of current conducting material, usually copper, and intervening separators or strips of insulating material, such as mica. For efficient operation the brush-engaging surface formed by the outer edges of the copper segments must be circular and smooth, and each segment must be completely insulated from adjacent bars.

Heretofore the manufacture of these commutators has been relatively expensive. Because the mica separators are considerably harder than the copper segments, a satisfactory brush surface cannot be obtained by a turning operation as the variations in hardness of the alternating elements produces chattering. Undercutting the mica separators to form the edges thereof inwardly of the edges of the copper segments requires sawing the separators by hand and is a tedious and expensive job. At the same time, if any mica fin is left, sparking will result when the commutator is put in use. Even after the mica is cut down, turning the copper bars or segments tends to drag the copper from one segment over the intervening space and thus short adjacent segments.

An object of this invention is to simplify and reduce the cost of making commutators.

A further object is to provide an improved and relatively inexpensive method of manufacturing commutators which will insure a smooth and absolutely circular brush face without burrs, fins or other defects.

A further object is to provide a method of the type described in which a circular and smooth brush face may be produced by a single inexpensive cutting or shearing operation.

With the foregoing and other objects in view, I have devised the construction illustrated in the accompanying drawing forming a part of this specification. It is however, to be understood the invention is not limited to the specific details of construction and arrangement shown, but may embody various changes and modifications within the scope of the invention.

In this drawing:

Fig. 1 is a section through one embodiment of a cutting die employed in the present method;

Fig. 2 is a view, partly in section, of one type of commutator produced by the present method;

Fig. 3 is a smiliar view showing an insulating separator of mica in elevation;

Fig. 4 is a section similar to Figs. 2 and 3 showing a modified form of commutator produced by the present method;

Fig. 5 is a partial elevation of a commutator before final shaping and finishing of the brush surface, and Fig. 6 is a similar view showing the finished product.

For the purposes of disclosure, the present invention is illustrated in connection with the manufacture of a commutator having a supporting core or sleeve 11 surrounded by an insulating sleeve 12 of mica or other suitable material, and formed with an annular V-shaped shoulder 13 adapted to be covered by a similarly shaped mica or other insulating ring 14. Alternating copper bars or segments 15 and mica separators 16, each having recessed side edges forming dovetails 17 and 17a, respectively, are supported around the core 11 and secured thereto by a V-shaped mica ring 18 and a V-shaped steel retaining ring 19, the assembly being secured together by forging or spinning the end 21 of the core over the ring 19 to clamp the ring 19 and other parts, as shown in Figs. 1, 2 and 3.

As shown in Fig. 5, each mica separator 16 has less radial depth or width than the copper bars or segments 15, a shoulder 23 being usually formed at one end of each insulating separator. Assuming that the elements are assembled as described, the outer edges of the copper segments 15 are flat as originally formed and present substantially the appearance shown at 15a in Fig. 5. In the present invention, the outer edges of the segments are cut to circular form to provide a smooth, circular brush surface by a shearing operation axially of the assembly, that is, in the direction longitudinally of the edges of the segments and the axis of the commutator. Such an operation can be easily accomplished, for example, by pressing the assembly through an annular, circular cutting die.

As illustrated in Fig. 1, such a cutting die 25 is secured on a supporting shoulder 26 of a die block 27 by a retaining ring 28 secured in the die block by fasteners 29. A work supporting member 31 is supported for sliding movement within the die 25 on a supporting spring 32 having one end seating in a recess 33 in the bottom of the work support 31 and the other end seating on a threaded plug 34 in the outer threaded end of an opening 34a drilled in a supporting bed 35. A work centering pin 36 is mounted in a recess 37 in the upper end of the work support 31 and extends upwardly therefrom. A plunger 38 which is recessed to receive the end of the pin is reciprocally supported above the die by any suitable operating means (not shown). The recess 37 in the work support 31 is of such size that the surrounding wall 37a of the work support engages the lower ends of the copper segments 15 only to form a direct support for these segments, and the work engaging end of the plunger 38 has a hole 39 to slidably engage and center the end of the pin 36, so that the work, the die, and the plunger are accurately centered and guided. The end of the plunger is recessed at 38a to provide an annular work engaging face 40 of such size as to engage only the upper ends of the commutator segments 15 so that the cutting forces are applied only and directly to such segments. In this way the inner core 11, the insulating sleeve 12 and V-shaped mica rings 13, 18 are not subjected to such forces.

In manufacturing a commutator by the present method, the copper bars or segments 15 and the intervening insulating separators 16 together with the associated insulating core sleeve 12 and V-shaped rings 13, 18, are first assembled on the supporting core 11 and the assembly secured together by shaping over the end 21 of the sleeve. At this stage the assembly has the appearance shown in Fig. 5 with the flat, unshaped edges 15a of the copper segments projecting outwardly beyond the edges of the intervening insulating separators, the outer edges of which are spaced inwardly of the edges 15a of the segments. The assembly is then placed on the top of supporting members 31 and on the centering pin 36, which are held in their upper position above the die 25 by the spring 32, the upper limit of the guide member 31 being determined by a flange 41 on the lower end of the guide member engaging the bottom edge 42 of the die 25. At this time the plunger 38 is in raised position. When in place on the guide member 31 the assembly will be supported above the die 25 with the cutting edge 25a opposite the lower ends of the copper segments adjacent the edges 15a. Upon descent of the plunger, the segments are engaged by the annular face 40 and the assembly pressed through the cutting die. An absolutely circular brush surface is accurately and smoothly formed by the cutting edge 25a of the die which broaches or shears the outer edges of the copper segments to the correct form without producing any burr, fin or the like. The resulting brush surface 15b is accurately sized and shaped by the die, as indicated in Fig. 6. The thin chips sheared off in the operation are shown at 44 in Fig. 1, the depth of cut and thickness of these chips being exaggerated.

Possible damage to the cutting edges is avoided by forming the work engaging face 40 of plunger 38 with an outside diameter sufficiently less than the cutting edge to prevent contact therebetween.

When the finished commutator is the type having a surface two diameters 45 and 46 separated by a shoulder 43, as shown in Fig. 4, such surface is preferably formed by successive cuts with dies of successively reduced diameters, the first of which shapes the segments to the radius of the larger diameter and the last of which shapes the brush surface to the smaller proper size and diameter, the last cutting operation terminating at the shoulder 43. The remaining chips or curls can be easily trimmed off. Although the outer edges 16a of the insulating separators are shown spaced inwardly of the outer edges of the copper segments 15, they are not necessarily so, as the same method can be used if the outer edges of these insulating separators are flush with the outer surfaces of the commutator segments. In this case the outer edges of the separators would be accurately sheared in the die with the edges of the commutator segments and in the same cylindrical surface.

By means of the present method, the brush surface of a commutator can be accurately and quickly formed by a single simple cutting or shearing operation. No short-producing burrs, no spark-making fins are formed, and the result is an improved product at a greatly lessened cost.

Having thus set forth the nature of my invention, I claim:

1. The method of making commutators which comprises assembling electrically conducting commutator segments and intervening insulating separators in their permanent relative positions on a supporting means and then shaping the outer edges of said segments to form a circular brush face by simultaneously shearing each of said edges longitudinally throughout the entire periphery of the commutator while the segments are in their permanent relative positions with a circular cutting edge by relative movement between this cutting edge and the commutator in a direction axially of the commutator.

2. The method of making commutators which comprises assembling electrically conducting commutator segments and intervening insulating separators in their permanent relative positions on a supporting means and then shaping the outer edges of said segments by forcing the assembly longitudinally through an annular circular cutting die to simultaneously shear each of said outer edges longitudinally throughout the entire periphery of the commutator while the segments are in their permanent assembled positions to form a circular brush face.

3. The method of making commutators which comprises assembling electrically conducting commutator segments and intervening insulating separators in their permanent relative positions on a supporting core and then shaping the outer edges of said segments by first passing this assembly longitudinally through an annular cutting die having a circular cutting edge to simultaneously shear longitudinally the entire length of each and all of said outer edges to circular form, and then passing the assembly longitudinally only partially through a second annular cutting die having a circular cutting edge of less diameter than the first die to simultaneously shear longitudinally a determinate part only of less than the entire length of each and all of said outer edges to a circular form of less diameter, leaving a shoulder of determinate diameter adjacent one end of each segment joining the two diameters, and removing the chips formed by said second die.

4. The method of making commutators which comprises assembling electrically conducting commutator segments and intervening insulating separators in their permanent relative positions on a supporting means with one end of the segments exposed, then shaping the outer edges of said segments to form a circular brush face by simultaneously shearing each of said edges longitudinally throughout the entire periphery of the commutator while the segments are in their permanent positions with a circular cutting edge, and securing said shearing action by imparting a relative movement between this cutting edge and the commutator in a direction longitudinally of the axis of the commutator by pressure on the said exposed ends of the segments only.

References Cited in the file of this patent

UNITED STATES PATENTS

| Number | Name | Date |
|---|---|---|
| 166,337 | Brown | Aug. 3, 1875 |
| 539,022 | Batchelder | May 14, 1895 |
| 662,465 | Priest | Nov. 27, 1900 |
| 1,274,411 | Halbleib | Aug. 6, 1918 |
| 1,361,568 | Donaldson | Dec. 7, 1920 |
| 2,145,091 | Mansfield | Jan. 24, 1939 |
| 2,230,639 | Calcagni | Feb. 4, 1941 |
| 2,233,928 | Weaver | Mar. 4, 1941 |
| 2,303,106 | Baurhenn | Nov. 24, 1942 |
| 2,379,584 | Litton | July 3, 1945 |
| 2,557,308 | Nippert | June 19, 1951 |